United States Patent [19]
Carlsson

[11] Patent Number: 5,261,628
[45] Date of Patent: Nov. 16, 1993

[54] DAMPING DEVICE IN AN OPEN-FACE FISHING REEL OF THE FIXED-SPOOL TYPE

[75] Inventor: Karl L. Carlsson, Asarum, Sweden
[73] Assignee: ABU Garcia Produktion AB, Svangsta, Sweden
[21] Appl. No.: 832,454
[22] Filed: Feb. 7, 1992
[51] Int. Cl.⁵ .............................................. A01K 89/01
[52] U.S. Cl. ................................................. 242/233
[58] Field of Search ............... 242/230, 231, 232, 233

[56] References Cited

U.S. PATENT DOCUMENTS

| | | | |
|---|---|---|---|
| 4,095,756 | 6/1978 | Morishita | 242/232 |
| 4,147,313 | 4/1979 | Sazaki | 242/232 |
| 4,279,387 | 7/1981 | Morimoto | 242/232 |
| 4,480,803 | 11/1984 | Sazaki | 242/232 |
| 4,792,106 | 12/1988 | Hlava | 242/233 |
| 4,932,616 | 6/1990 | McMickle et al. | 242/233 |
| 4,941,626 | 7/1990 | Carlsson | 242/231 |
| 5,096,137 | 3/1992 | Carlsson et al. | 242/233 |

*Primary Examiner*—Daniel P. Stodola
*Assistant Examiner*—Michael R. Mansen
*Attorney, Agent, or Firm*—Browdy and Neimark

[57] ABSTRACT

An open-face fishing reel of the fixed-spool type has a rotor, a line spool coaxial with the rotor, and a bail for winding a line on the spool. Two attachments are provided on the rotor. Two mounting elements carrying the bail are so rotatably mounted on a respective attachment that the bail is pivotable about a bail axis perpendicular to the rotor axis, between a folded-in line-winding position and a folded-out position in which it is released of the line. One attachment has an open chamber. The damping device has an elastic damping element provided in the chamber under one mounting element which has a lug for cooperating with the damping element. The damping element and the lug are so positioned that the lug, when the bail is pivoted from its folded-out position to its folded-in line-winding position, engages the damping element in order, during the final phase of the pivotal movement, to compress the damping element so as to bring about a gentle braking of the rotational movement.

1 Claim, 3 Drawing Sheets

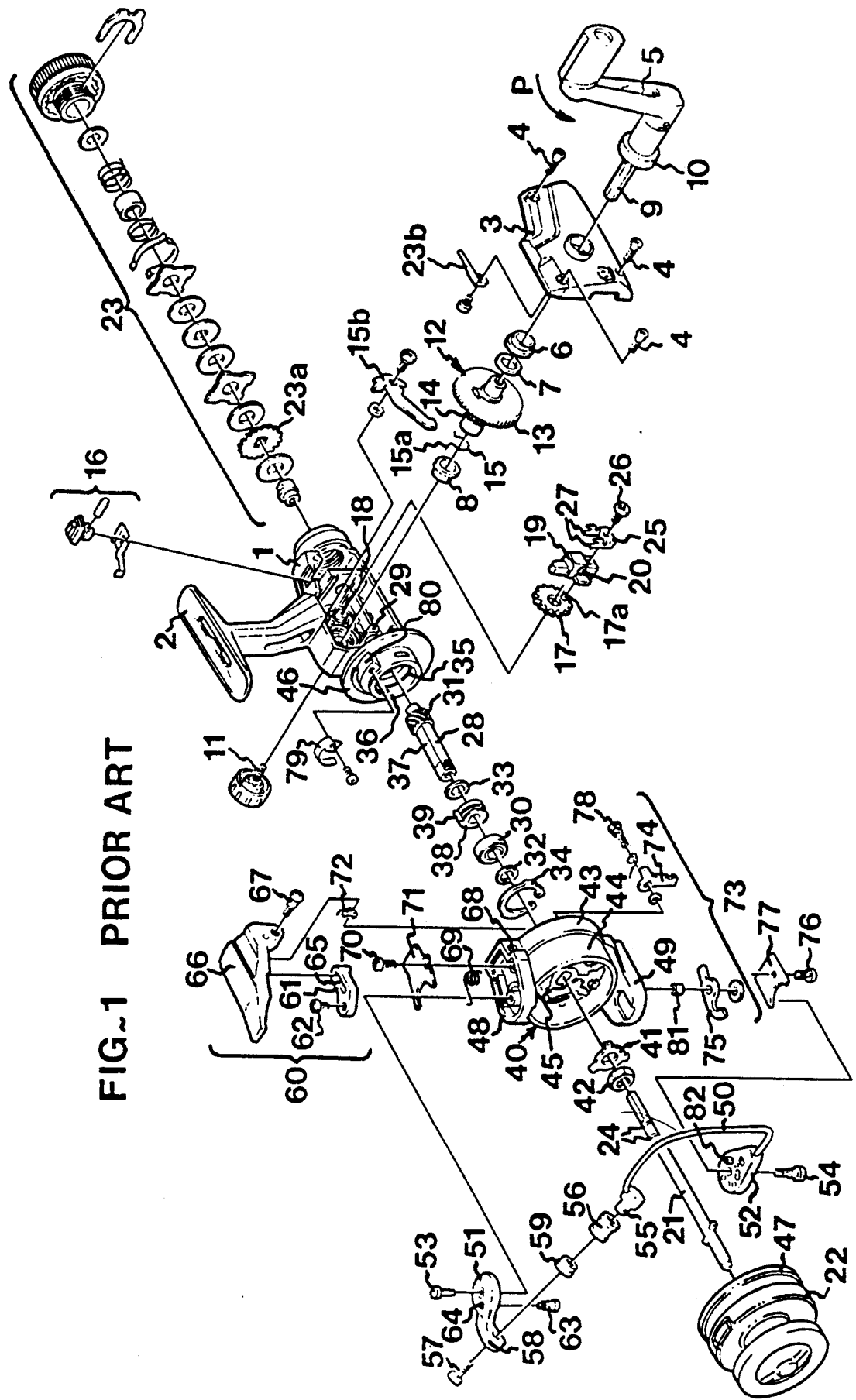

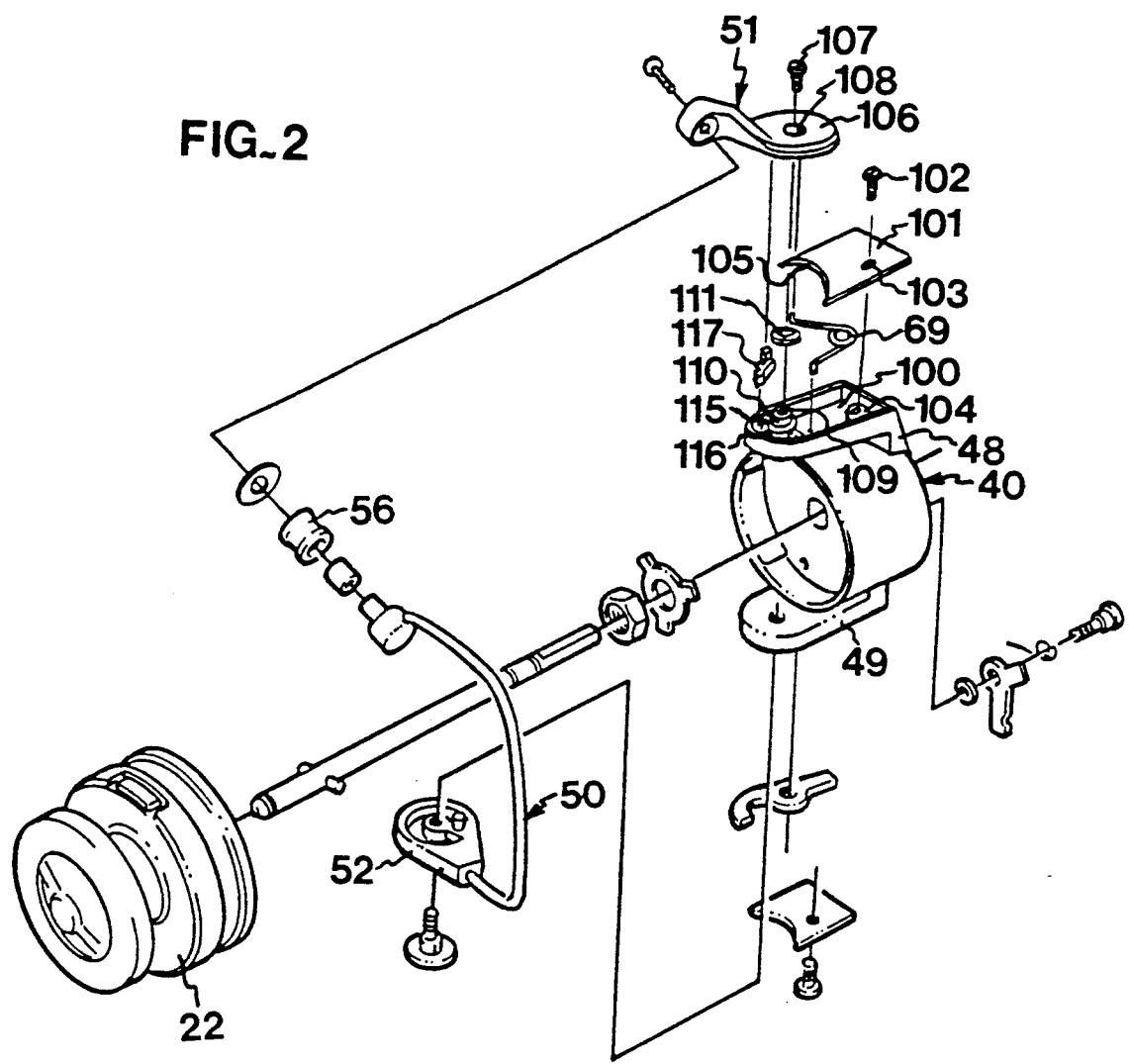

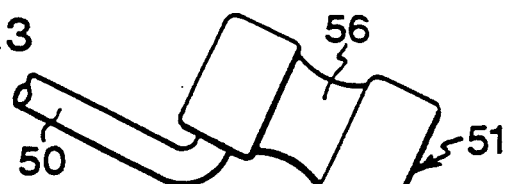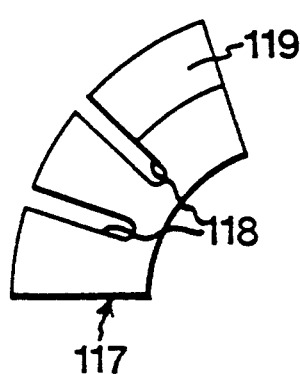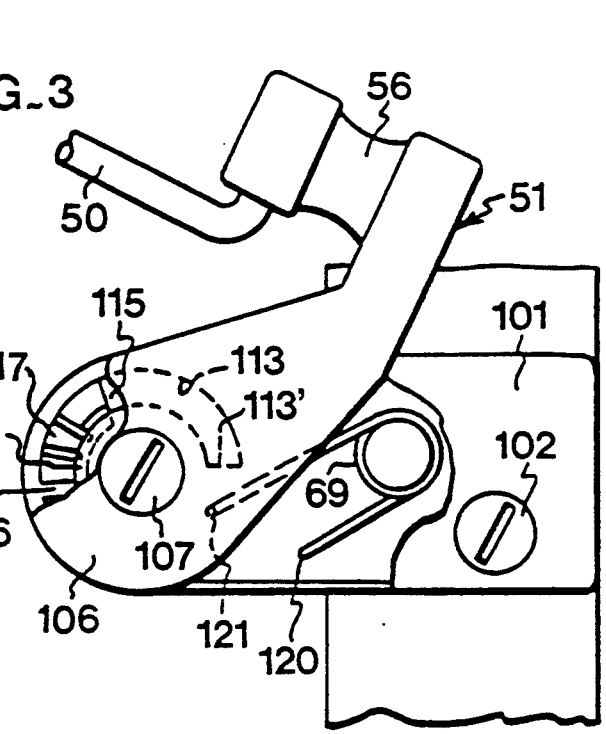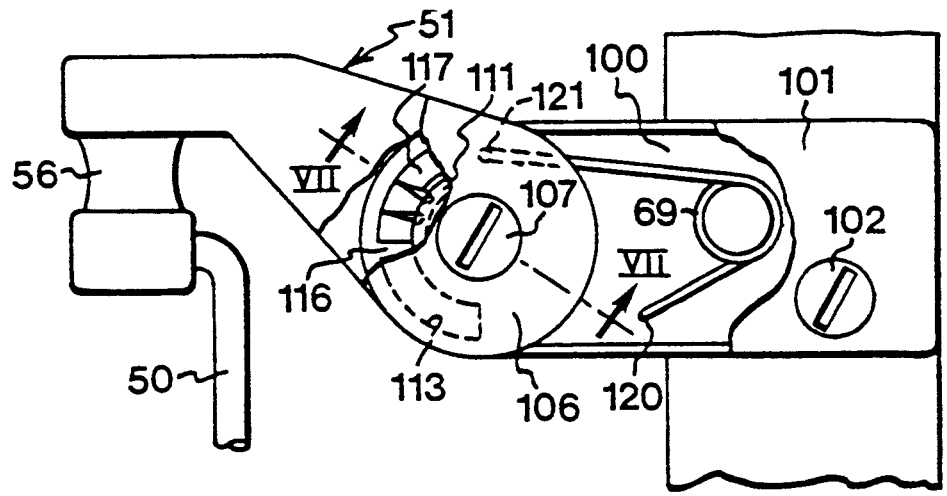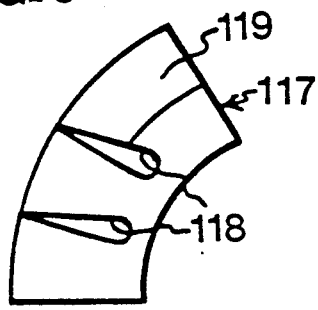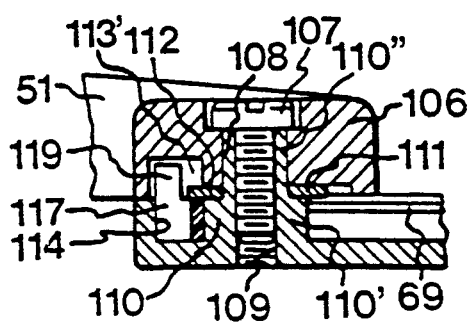

DAMPING DEVICE IN AN OPEN-FACE FISHING REEL OF THE FIXED-SPOOL TYPE

BACKGROUND OF THE INVENTION

The present invention relates to a damping device in an open-face fishing reel of the fixed-spool type.

DESCRIPTION OF THE PRIOR ART

Prior-art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle and, thus, the line spool in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line on the line spool. During line retrieve, the line is thus wound on the line spool which, as opposed to the rotor, does not rotate, but instead executes an axial oscillatory movement. In this manner, the line will be distributed across the line spool.

The bail mechanism has a bail for winding the line on the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between a folded-in line-winding position, in which it extends substantially at right angles to the spindle, and a folded-out position, in which it is located on the opposite side of the spindle and makes an angle therewith which is of the order of 45°. The bail is maintained in both positions by a spring arranged in one of the attachments underneath a cover plate fixed thereon.

Before a cast is to be made, the bail is pivoted to its folded-out position. During the cast, the line is unwound from the line spool. When the line-retrieving operation is started after a cast, the bail is automatically pivoted back to its folded-in position. This automatic return of the bail to its folded-in position is brought about by means of a return mechanism. This return mechanism has stop means, with the aid of which the mounting elements are arrested when reaching their position of rotation corresponding to the folded-in position of the bail. One drawback of conventional return mechanisms is that the stop means generally produce an unpleasant jerk giving rise to a rattle which may lead to premature fatigue of the spring, when the rotational movement of the mounting elements is stopped in its position of rotation corresponding to the folded-in position of the bail.

SUMMARY OF THE INVENTION

The object of the present invention is to provide a simple damping device overcoming the above-related drawback.

According to the present invention, this object is achieved by means of a damping device in an open-face fishing reel of the fixed-spool type having a housing, a rotor mounted on said housing, a line spool coaxial with said rotor and adapted to oscillate in the axial direction, and a bail mechanism having a bail for winding a line on said line spool, two attachments arranged on said rotor substantially diametrically opposite each other, two mounting elements which carry said bail, are mounted each on one of said attachments and are so rotatable between two end positions that the bail is pivotable about a bail axis substantially at right angles to the axis of said rotor, between a folded-in line-winding position and a folded-out position in which said bail is released of the line, and a spring engaging one of said mounting elements to retain it in its end positions, the attachment corresponding to said one mounting element being so designed as to form an open chamber accommodating said spring, and having a cover plate mounted over said chamber in order, together with said one mounting element, to cover said chamber, said damping device having an elastic damping element provided in said chamber underneath said one mounting element, and a lug formed on said mounting element and adapted to cooperate with said damping element, said damping element and said lug being so positioned that the lug, when said one mounting element is rotated from its end position corresponding to the folded-out position of said bail to its end position corresponding to the folded-in line-winding position of the bail, engages the damping element in order, during the final phase of the rotation, to compress the damping element so as to provide a gentle braking of the movement of rotation.

BRIEF DESCRIPTION OF THE DRAWINGS

The invention will now be described in more detail with reference to the accompanying drawings, in which:

FIG. 1 is an exploded view showing a known open-face fishing reel of the fixed-spool type equipped with a known return mechanism.

FIG. 2 is a partial exploded view showing an open-face fishing reel of the fixed-spool type equipped with a damping device according to the present invention, illustrating only that part of the fishing reel which is of particular interest in the inventive context.

FIG. 3 is a top plan view showing a portion of the fishing reel with a bail in the folded-out position.

FIG. 4 is a top plan view showing a damping element, forming part of the damping device, in an undeformed state.

FIG. 5 is a top plan view corresponding to FIG. 3 and showing a portion of the fishing reel with the bail in the folded-in position.

FIG. 6 is a top plan view showing the damping element in a compressed state, and FIG. 7 is a section taken along the line VII—VII in FIG. 5.

DESCRIPTION OF THE PREFERRED EMBODIMENT

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The, shaft 9 has square cross-section throughout the major part of its length and non-rotatably carries a gear unit 12. The gear unit 12 comprises a driving gear 13 with axially directed teeth on its side facing away from the cover 3, and a smaller driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed in the housing 1 so as to form a so-called silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the smaller driving gear 14 and has an axially directed eccentric pin 17a engaging in a vertical groove (not shown) in a driver element 19. The driver element 19 has a through bore 20 through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24 between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21, which however is rotatable relative to the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 non-rotatably connected thereto and meshing with the larger driving gear 13. The ball bearing 30 is surrounded by two spacer washers 32 and 33 and maintained in place by a locking washer 34 engaging in an inner groove 35 in a sleeve 36 axially projecting from said end wall of the housing 1. The rotor shaft 28 has two diametrically opposed planar surfaces 37 forming a so-called flat and non-rotatably carrying a ring 38 between the ball bearing 30 and the spacer washer 33. The ring 38 has a radial stop lug 39 for cooperating with the pawl 15b On its outer end, the rotor shaft 28 non-rotatably carries a rotor 40 secured to the rotor shaft by a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54 forming a pivot shaft for the bail at right angles to the spindle 21. The bail 50 is pivotable between an operative folded-in position, which is shown in FIG. 1 and in which it extends substantially at right angles to the spindle 21, and an inoperative folded-out position, in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 extending through an arm 58 on the mounting element 51 and through a spacer sleeve 59 and screwed in the bearing pin 55.

When turning the handle 5 in the direction of line retrieve P, i.e. in the direction in which a fishing line (not shown) fixed to the line spool 22 is wound on the line spool, the larger driving gear 13 drives the gear 31, such that the rotor 40 and, thus, the bail 50 are rotated. At the same time, the smaller driving gear 14 drives the oscillating gear 17, such that the driver element 19, by the engagement of the eccentric pin 17a in the vertical groove therein, is moved back and forth so as to oscillate the spindle 21 and, thus, the line spool 22 in the longitudinal direction of the spindle. The spindle 21 and the line spool 22 are however not rotated during line retrieve. The fishing line runs over the line roller 56 on the folded-in bail 50 and is wound on the line spool 22 during the rotation of the bail. Since the line spool 22 is oscillated during the line-winding operation, the line is distributed axially across the line spool.

Before a cast is to be made, the bail 50 is pivoted to the folded-out position so as to release the line from the line roller 56. During the cast, the line is paid out from the line spool 22 which, like the rotor 40, remains still during the cast. When line retrieve is again to be effected after a cast, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61, one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66 is pivoted, for instance by the index finger, a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28 and, thus, the ring 38 non-rotatably mounted thereon being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79, on the fixed sleeve 36. The lever 75 is rotatable about a pin 81 parallel to the screw 54 about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74 which in turn acts on the lever 75 in such a direction that, by cooperating with the projection 82, it will pivot the bail 50 to its folded-in position.

During the final phase of the pivotal movement of the bail 50 from its folded-out position to its folded-in position, as also during the final phase of the pivotal movement of the bail from its folded-in position to its folded-out position, this pivotal movement is promoted by the spring 69 which thereafter, as mentioned above, retains the bail 50 in its folded-in and folded-out position, respectively. When the bail 50 is in its folded-in position, the projection 82 of the mounting element 52 engages a lug (not shown) provided in the attachment 49.

In the known fishing reel described above, the return mechanism suffers from the shortcoming stated by way of introduction, namely that an unpleasant jerk giving rise to a rattle which may lead to premature fatigue of the spring 69, is produced when the projection 82 encounters the lug in the attachment 49.

An open-face fishing reel of the fixed-spool type provided with a damping device according to the present invention will now be described in more detail with reference to FIGS. 2–7. FIG. 2, corresponding to FIG. 1, illustrates only that part of the fishing reel which is of particular interest in the present invention. The components of the fishing reel not shown in FIG. 2 and not described in more detail with reference to FIGS. 2–7 are essentially similar to corresponding components in the fishing reel of FIG. 1.

The attachment 48 in the fixed-spool type fishing reel according to FIG. 2 is so designed as to form an open chamber 100 and has a cover plate 101 mounted over the rear portion of the chamber. The cover plate 101 is fixed to the attachment 48 by a screw 102 passing through a hole 103 in the cover plate 101 and screwed in a threaded bore in a base 104 provided in the chamber 100 adjacent one side wall thereof. The cover plate 101 has a circular-arc-shaped recess 105 at its front end.

The mounting element 51 has a circular disk portion 106 of substantially the same diameter as the recess 105 in the cover plate 101. The mounting element 51 is rotatably fixed to the attachment 48 by means of a screw 107 corresponding to the screw 53 in FIG. 1 and passing through a center hole 108 in the disk portion 106 and screwed in a threaded bore 109 in a base 110 provided in the chamber 100 in the front portion thereof. The base 110 has a lower portion 110' and an upper portion 110" having a smaller diameter than the lower portion 110' and extending into the center hole 108 of the disk portion 106. The disk portion 106 engages a washer 111 resting on the shoulder 112 formed between the two portions 110' and 110" of the base 110. The disk portion 106 and the cover plate 101 together cover the chamber 100.

At its underside, the disk portion 106 has a circular-arc-shaped groove 113 which extends through slightly more than 180°.

The attachment 48 has a circular-arc-shaped pocket 114 defined by the circular-arc-shaped front wall of the attachment, the lower portion 110' of the base 110 and two end walls 115 and 116 substantially radial with respect to the base and to the front wall of the attachment. The pocket 114 extends through about 65°. A damping element 117 of a shape corresponding to that of the pocket 114 is placed therein. The damping element 117 is made of an elastic material, such as elastic polymer plastic, and has two substantially radial slots 118 extending from the circular-arc-shaped outer side of the damping element towards its circular-arc-shaped inner side through more than half the width of the damping element (FIG. 4). The damping element 117 has the same height as the lower portion 110' of the base 110 and is held in place in the pocket 114 by the washer 111. At one end, the damping element 117 has a projection 119 in the form of a raised portion which, when the damping element 117 is disposed in the pocket 114, is located radially outwardly of the washer 111 and extends up into the groove 113 at the underside of the disk portion 106 (FIG. 7).

The mounting element 51 is rotatable between a first position (FIG. 5) corresponding to the folded-in position of the bail 50, and a second position (FIG. 3) corresponding to the folded-out position of the bail 50. The mounting element 51 is retained in its end positions by the torque spring 69 engaging with one end in a hole 120 in the bottom wall of the chamber 100 and with its other end in an eccentrically positioned hole 121 in the disk portion 106.

The bail 50 can be seized with one hand to be pivoted from its folded-in position to its folded-out position. The fishing reel according to FIG. 2 may, if so desired, be supplemented with a trigger mechanism corresponding to the trigger mechanism 60 described above with reference to FIG. 1. The bail 50 is automatically swung back from its folded-out position to its folded-in position as soon as the line-retrieving operation is commenced after a cast. This is carried out by means of a return mechanism corresponding to the return mechanism 73 described above with reference to FIG. 1.

When the bail 50 is to be swung away from its folded-out position (FIG. 3), the mounting element 51 is rotated anti-clockwise with respect to FIGS. 3 and 5, one end wall 113' of the groove 113 formed at the underside of the disk portion 106 encountering the projection 119 of the damping element 117 just before the mounting element 51 reaches its first position, i.e. the position corresponding to the folded-in position of the bail 50. The movement of the mounting element 51 and of the bail 50 is then gently braked by the damping element 117 in that this is compressed from the undeformed state shown in FIG. 4 into the compressed state shown in FIG. 6.

What I claim and desire to secure by Letters Patent is:

1. A damping device in an open-face fishing reel of the fixed-spool type having a housing, a rotor mounted on said housing and having an axis, a line spool coaxial with said rotor and adapted to oscillate in the axial direction of said rotor, and a bail mechanism having a bail for winding a line on said line spool, two attachments arranged on said rotor substantially diametrically opposite each other, two mounting elements which carry said bail, are mounted each on one of said attachments and are so rotatable between two end positions that said bail is pivotable about a bail axis substantially at right angles to the axis of said rotor, between a folded-in line-winding position and a folded out position in which said bail is released of the line, and a spring engaging one of said mounting elements to retain it in its end positions, the attachment corresponding to said one mounting element being designed so as to form an open chamber accommodating said spring, and having a cover plate mounted over said chamber in order, together with said one mounting element, to cover said chamber, said damping device having an elastic damping element provided in said chamber underneath said one mounting element, and a shoulder formed on said one mounting element to cooperate with said damping element, said damping element and said shoulder being so positioned that the shoulder, when said one mounting element is rotated from its end position corresponding to the folded-out position of said bail, to its end position corresponding to the folded-in line-winding position of said bail, engages said damping element in order, during a final phase of the rotation of said one mounting element, to compress the damping element so as to provide a gentle braking of the movement of said rotation, said damping element being retained in a circular-arc-shaped pocket provided in said chamber, a circular-arc-shaped groove being formed in said one mounting element at its side facing said chamber, said damping element having a projection extending into said groove, one end wall of which forms said shoulder, and said damping element comprising a circular-arc-shaped body having at least one substantially radial slot permitting deformation of said circular-arc-shaped body.

* * * * *